(12) United States Patent
Ueno

(10) Patent No.: US 9,849,634 B2
(45) Date of Patent: Dec. 26, 2017

(54) SHEET MANUFACTURING APPARATUS AND SHEET MANUFACTURING METHOD

(71) Applicant: SEIKO EPSON CORPORATION, Tokyo (JP)

(72) Inventor: Yoshihiro Ueno, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 66 days.

(21) Appl. No.: 14/984,100

(22) Filed: Dec. 30, 2015

(65) Prior Publication Data

US 2016/0229129 A1    Aug. 11, 2016

(30) Foreign Application Priority Data

Feb. 6, 2015    (JP) ................................. 2015-021829

(51) Int. Cl.
| | |
|---|---|
| *D04H 1/732* | (2012.01) |
| *D04H 1/413* | (2012.01) |
| *D21F 9/00* | (2006.01) |
| *B29C 70/06* | (2006.01) |
| *B29B 7/38* | (2006.01) |
| *B29D 7/01* | (2006.01) |
| *D21B 1/02* | (2006.01) |
| *B29K 103/06* | (2006.01) |
| *B29K 1/00* | (2006.01) |

(52) U.S. Cl.
CPC ............... *B29C 70/06* (2013.01); *B29B 7/38* (2013.01); *B29D 7/01* (2013.01); *D04H 1/413* (2013.01); *D04H 1/732* (2013.01); *D21B 1/021* (2013.01); *D21F 9/00* (2013.01); *B29K 2001/00* (2013.01); *B29K 2103/06* (2013.01)

(58) Field of Classification Search
None
See application file for complete search history.

(56) References Cited

U.S. PATENT DOCUMENTS

| | | | | |
|---|---|---|---|---|
| 4,290,988 | A * | 9/1981 | Nopper .................... | B27N 3/04 264/112 |
| 5,432,000 | A * | 7/1995 | Young, Sr. ............. | D04H 1/425 428/357 |
| 6,305,920 | B1 * | 10/2001 | Kean ........................ | D04H 1/72 264/122 |
| 2011/0250461 | A1 * | 10/2011 | Frost ........................ | B32B 5/26 428/446 |

(Continued)

FOREIGN PATENT DOCUMENTS

| | | |
|---|---|---|
| JP | 2011-099172 A | 5/2011 |
| JP | 2014-047445 A | 3/2014 |
| JP | 2015-092032 A | 5/2015 |

OTHER PUBLICATIONS

The Extended European Search Report for the corresponding European Application No. 16153667.7 dated Oct. 3, 2016.

*Primary Examiner* — Mary F Theisen
(74) *Attorney, Agent, or Firm* — Global IP Counselors, LLP

(57) ABSTRACT

A sheet manufacturing apparatus includes a mixing unit that mixes fibers and a composite in the atmosphere, a forming unit that deposits and heats a mixture mixed by the mixing unit to form a sheet; in which the composite is resin particles with at least a portion of a surface coated by inorganic fine particles, and an absolute value of an average charging amount of the composite is 40 µC/g or higher.

8 Claims, 2 Drawing Sheets

(56) References Cited

U.S. PATENT DOCUMENTS

2014/0020212 A1* 1/2014 Ghijzen .................. C03C 13/06
 19/308
2015/0021805 A1* 1/2015 Henderson ............... D04H 1/44
 264/103
2015/0204015 A1 7/2015 Gomi et al.

* cited by examiner

SHEET MANUFACTURING APPARATUS AND SHEET MANUFACTURING METHOD

BACKGROUND

1. Technical Field

The present invention relates to a sheet manufacturing apparatus and a sheet manufacturing method.

2. Related Art

Depositing a fiber-like material and causing a bonding force between the deposited fibers to obtain a sheet-like or film-like formed body has been performed for a long time. Typical examples thereof include manufacturing paper by pulp molding (paper-forming) using water. Even in present times, pulp molding is widely used as an example of a method of manufacturing paper. The paper manufactured by pulp molding generally includes a structure by cellulose fibers derived from wood or the like being entangled with one another, and being partially bonded to one another by a binder (paper strengthening agent (such as a starch paste and a water-soluble resin)).

According to the pulp molding, it is possible for the fibers to be deposited in a state where uniformity is favorable, and, in a case where a paper strengthening agent is used in the bonding between fibers, it is possible for the paper strengthening agent to be dispersed (distributed) in a state where the uniformity in the paper surface is good. However, because the pulp molding is a wet method, it is necessary to use large volumes of water, and the necessity of dewatering and drying, or the like, arises after forming the paper, and therefore the energy or time consumed is extremely large. It is necessary to suitably process the water used as waste water. Accordingly, it is difficult to respond to modern demands for energy savings, environmental protection, and the like. The apparatuses used in pulp molding frequently need large scale utilities such as water, power, and drainage facilities, and size reductions are difficult. From this viewpoint, there is an expectation of methods, referred to as dry methods that use no or almost no water as paper manufacturing methods in place of pulp molding.

For example, in the technology disclosed in JP-A-2011-099172, an attempt at bonding fibers to one another with a thermal fusion-bondable resin in air-laid non-woven fabric that includes a highly water absorbent resin is disclosed.

However, in the technology disclosed in JP-A-2011-099172, the thermal fusion-bondable resin has the properties of a powder, and there is a danger of detachment from between the fibers when air-laid. Paragraph [0013] in JP-A-2011-099172 discloses that when thermal fusion-bondable powder is too small, the powder passes through the mesh conveyor (mesh belt) and it is difficult for the fibers to be bonded to one another. Accordingly, JP-A-2011-099172 describes that it is favorable to use a thermal fusion bondable resin powder of the comparatively large particle diameter (20 mesh pass to 300 mesh on).

However, when the particle diameter of the resin is large, the uniformity of the distribution of the resin in the manufactured sheet may be impaired. Accordingly, it is desirable that the particle diameter of the resin is smaller in order for the resin to be uniformly dispersed between the fibers.

In a case of forming a web by air-laying, suctioning is ordinarily performed from below the mesh belt. Thus, when the particle diameter of the resin is smaller than the size of the openings in the mesh belt, it is thought that the resin easily detaches from between the fibers during web formation. Therefore, even if the particle diameter of the resin is reduced, work is necessary to make the resin difficult to detach from between the fibers.

SUMMARY

An advantage of some aspects of the invention is to provide a sheet manufacturing apparatus and a sheet manufacturing method that uses a thermal fusion-bondable resin that is not easily detached from between fibers.

The invention can be realized in the following forms or application examples.

According to an aspect of the invention, there is provided a sheet manufacturing apparatus including a mixing unit configured to mix fibers and a composite in the atmosphere, and a forming unit configured to deposit and heat a mixture mixed by the mixing unit to form a sheet; in which the composite is resin particles with at least a portion of a surface covered with inorganic fine particles, and an absolute value of an average charging amount of the composite is 40 µC/g or higher.

According to the sheet manufacturing apparatus of the application example, because the composite that is resin particles with at least a portion of the surface is covered with the inorganic fine particles is mixed in air with fibers, the composite is more easily charged and attached to the fibers during mixing, and the composite is not easily detached from the fibers during forming of the web. Since the composite and the fibers are bonded (fusion bonded) in this state, it is possible to manufacture a sheet with favorable strength.

In the sheet manufacturing apparatus according to the aspect of the invention, the volumetric average particle diameter of the resin particles may be 25 µm or less.

According to the sheet manufacturing apparatus, because the composite is small on the order of 25 µm or less, the composite is easily mixed and easily dispersed between the fibers. The composite particle is small and has a light weight, and thus is not easily influenced by gravity and not easily detached from the web or sheet.

In the sheet manufacturing apparatus according to the aspect of the invention, the volumetric average particle diameter of the inorganic fine particles may be 40 µm or less.

When the average particle diameter of the inorganic fine particles is 40 nm or less, it is possible for the charging amount of the composite to be further increased.

In the sheet manufacturing apparatus of the aspect of the invention, the composite may not be divided into the resin and the inorganic fine particles during mixing in the mixing unit.

According to such a sheet manufacturing apparatus, since not only are the inorganic fine particles simply attached to the resin in a composite state, but the composite is also integrated to an extent where the resin and the inorganic fine particles are not divided during mixing, dropping of the inorganic fine particles less easily occurs during mixing.

In the sheet manufacturing apparatus according to the aspect of the invention, the forming unit may further include a discharging unit configured to discharge the mixture, a mesh belt configured to accumulate the mixture, and a suction unit configured to suctions gas that includes the mixture via the mesh belt.

By performing suction via the mesh belt, although the possibility of the composite detaching from the fibers increases, according to the sheet manufacturing apparatus of the application example, it is possible to suppress detachment of the composite from the fibers even when the suction unit is included.

In the sheet manufacturing apparatus according to the aspect of the invention, the content of the inorganic fine particles in the composite may be 0.1% by weight or more to less than 4% by weight.

According to such a sheet manufacturing apparatus, even if the content of the inorganic fine particles in the composite is reduced to 0.1% by weight or more to less than 4% by weight, it is possible to sufficiently obtain the charging effect. Therefore, it is possible for the usage amount of the inorganic fine particles to be reduced.

In the sheet manufacturing apparatus according to the aspect of the invention, the mixing unit may include a plurality of rotary units having blades that rotate, and may mix the fibers and the composite by being passed through the rotary unit.

According to such a sheet manufacturing apparatus, the composite is more easily charged, and less easily detaches from the fibers by the fibers and the composite being passed through the rotary unit having blades that rotate.

According to another aspect of the invention, there is provided a sheet manufacturing method including mixing the fibers and the composite, in which the resin and the inorganic fine particles are integrated, in air, and depositing, heating and forming a mixture in which the fibers and the composite are mixed.

According to such a sheet manufacturing method, because the composite that is resin particles covered with the inorganic fine particles is mixed in air with fibers, the composite is more easily charged and attached to the fibers during mixing, the composite is not easily detached from the fibers during forming of the web and it is possible to manufacture a sheet with favorable uniformity of strength or the like.

BRIEF DESCRIPTION OF THE DRAWINGS

The invention will be described with reference to the accompanying drawings, wherein like numbers reference like elements.

DESCRIPTION OF EXEMPLARY EMBODIMENTS

Below, various embodiments of the invention will be described. The embodiments described below are for describing examples of the invention. The invention is not limited in any way by the following embodiments, and includes various modifications carried out in a range not departing from the gist of the invention. Not all of the configurations explained below are indispensable configurations in the invention.

1. SHEET MANUFACTURING APPARATUS

The sheet manufacturing apparatus according to the embodiment includes a mixing unit that mixes fibers and a composite in the atmosphere, a forming unit that deposits and heats a mixture mixed by the mixing unit to form a sheet; in which the composite is resin particles with at least a portion of the surface covered by inorganic fine particles, and an absolute value of an average charging amount of the composite is 40 µC/g or higher.

1.1. Configuration

Figure 1:
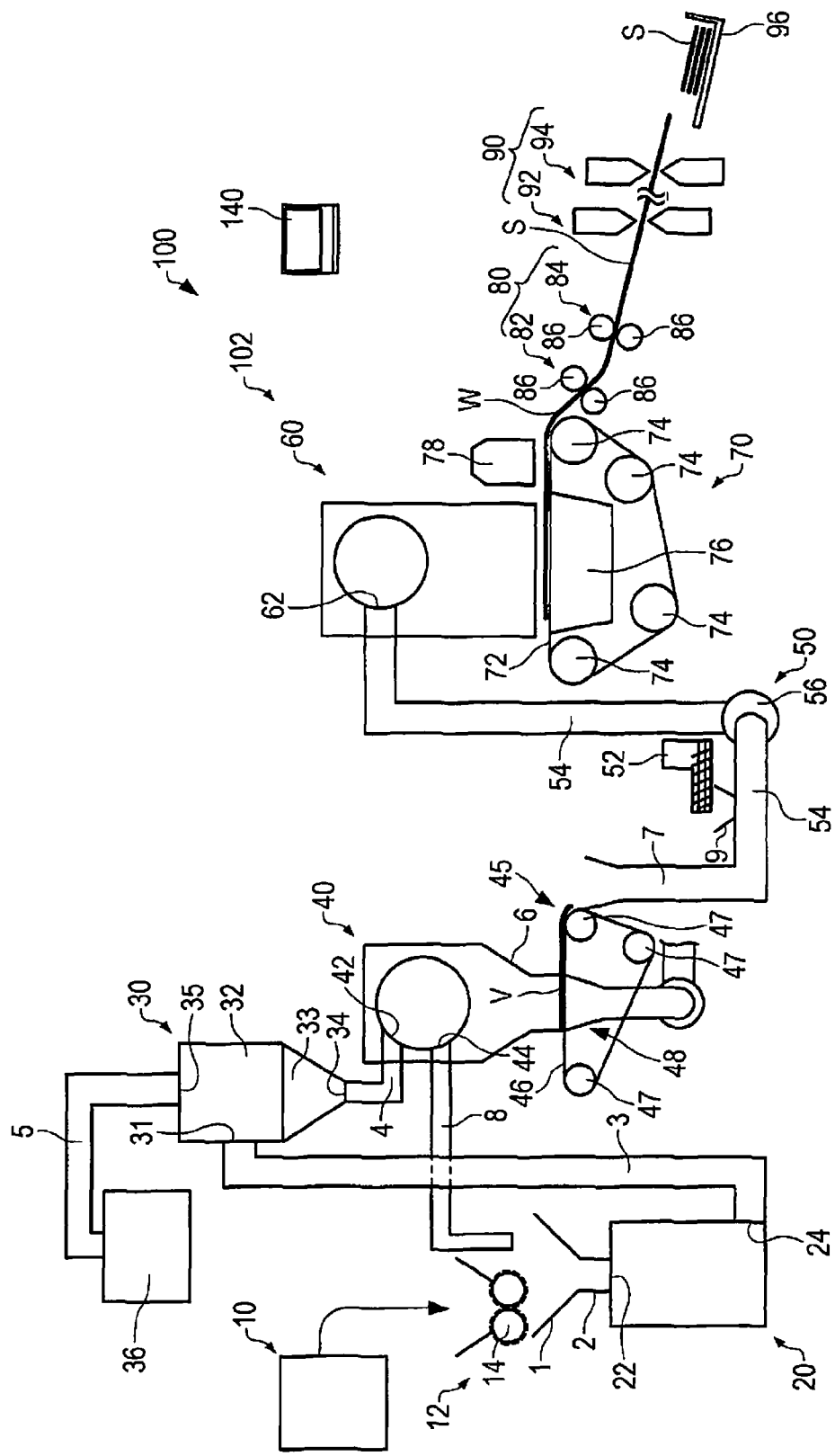
FIG. 1 is a drawing schematically showing a sheet manufacturing apparatus according to an embodiment.

First, an example of the sheet manufacturing apparatus according to the embodiment will be described with reference to the drawings. FIG. 1 is a drawing schematically showing a sheet manufacturing apparatus 100 according to the embodiment.

The sheet manufacturing apparatus 100 is provided with a supplying unit 10, a manufacturing unit 102, and a controller 140, as shown in FIG. 1. The manufacturing unit 102 manufactures a sheet. The manufacturing unit 102 includes a crushing unit 12, a defibrating unit 20, a classifying unit 30, a screening unit 40, a first web forming unit 45, a mixing unit 50, a deposition unit 60, a second web forming unit 70, a sheet forming unit 80, and a cutting unit 90.

The supplying unit 10 supplies raw materials to the crushing unit 12. The supplying unit 10 is an automatic feeding unit for continuously feeding the raw materials to the crushing unit 12. The raw materials supplied by the supplying unit 10 include fibers such as recycled pulp and pulp sheets.

The crushing unit 12 cuts the raw material supplied by the supplying unit 10 into small pieces in air. The shape and size of the small pieces is several cm squared. In the examples in the drawings, the crushing unit 12 includes a crushing blade 14, and it is possible for the fed raw materials to be cut by the crushing blade 14. A shredder is used as the crushing unit 12. The raw material cut by the crushing unit 12 is transferred (transported) to the defibrating unit 20 via a pipe 2 once received by a hopper 1.

The defibrating unit 20 defibrates the raw material cut by the crushing unit 12. Here, the wording "defibrates" refers to untangling the raw material (material to be defibrated) in which a plurality of fibers are bonded into individual fibers. The defibrating unit 20 also has a function of causing substances such as resin powder bonded to the raw material, ink toner, or blur-preventing agent to be isolated from the fibers.

The material that passes through the defibrating unit 20 is referred to as a "defibrated material". There are also cases where resin (resin for causing a plurality of fibers to bond to one another) powder isolated from the fibers when the fibers are untangled, colorants such as ink and toner, and additives such as bleeding inhibitors and paper strengthening agents are included in the "defibrated material" in addition to the untangled defibrated material fibers. The shape of the untangled defibrated material is string-like or ribbon-like. The untangled defibrated material may be present in a state of not being entangled with other untangled fibers (independent state) or may be present in a state being entangled with other untangled fibers to form a clump (a state of forming a so-called "lump").

The defibrating unit 20 performs defibrating with a dry method in the atmosphere (in air). Specifically, an impeller mill is used as the defibrating unit 20. The defibrating unit 20 has the function causing an airflow to be generated so as to suction the raw material and discharge the defibrated material. In so doing, it is possible for the defibrating unit 20 to suction the raw material along with the airflow from an introduction port 22, perform the defibration treatment, and transport the raw material to the exit port 24 with the self generated airflow. The defibrated material that passes through the defibrating unit 20 is transferred to the classifying unit 30 via the pipe 3.

The classifying unit 30 classifies the defibrated material passing through the defibrating unit 20. Specifically, the classifying unit 30 isolates and removes the defibrated material that is comparatively small or has a low density (such as resin powder, colorant, and additive) from the defibrated material. In so doing, it is possible to increase the proportion accounted for by fibers that are comparatively large or have a high density from the defibrated material.

An airflow classifier is used as the classifying unit 30. The airflow classifier generates a swirling airflow, and performs isolation according to differences in the centrifugal force received due to the size and density of the classified materials, and it is possible to adjust the classification points through adjustment of the speed of the airflow and the centrifugal force. Specifically, a cyclone, an elbow jet, an eddy classifier, and the like are used as the classifying unit 30. In particular, it is possible for the cyclone as shown in the drawings to be favorably used as the classifying unit 30 because the structure is simple.

The classifying unit 30 includes an introduction port 31, a body 32 connected to the introduction port 31, a reverse conical portion 33 positioned below the body 32 and contiguous with the body 32, a lower exit port 34 provided in the lower center of the reverse conical portion 33, and an upper exit port 35 provided in the upper center of the body 32.

In the classifying unit 30, the airflow that carries along the defibrated material introduced from the introduction port 31 is changed to a circular motion by the body 32. In so doing, centrifugal force is applied to the introduced defibrated material, it is possible for the classifying unit 30 to isolate the fibers (first classified material) with a higher density than the resin powder or the ink powder from the defibrated material and the resin powder with a lower density than the fibers, colorant, additives or the like (second classified material) from the defibrated material. The first classified material is discharged from the lower exit port 34, and introduced to the screening unit 40 via the pipe 4. Meanwhile, the second classified material is discharged from the upper exit port 35 to the receiving portion 36 via the pipe 5.

The screening unit 40 introduces the first classified material (defibrated material defibrated by the defibrating unit 20) passing through the classifying unit 30 from the introduction port 42 and screens the material according to fiber length. A sieve is used as the screening unit 40. The screening unit 40 includes a mesh (filter, screen) and is able to divide fibers or particles (first screened material passing through the mesh) that are smaller than the size of the openings of the mesh and included and fibers, non-defibrated pieces or lumps (second screened material not passing through the mesh) larger than the size of the opening in the mesh included in the first classified material. For example, the first screened material is transferred to the mixing unit 50 via the pipe 7 once received by the hopper 6. The second screened material is returned to the defibrating unit 20 from the exit port 44 via the pipe 8. Specifically, the screening unit 40 is a cylindrical sieve that is able to rotate by a motor. A metal mesh, an expanded metal in which a perforated metal plate is drawn, and a punched metal plate in which holes are formed in a metal plate by a pressing machine or the like are used as the mesh of the screening unit 40.

The first web forming unit 45 transports the first screened material passing through the screening unit 40 to the mixing unit 50. The first web forming unit 45 includes a mesh belt 46, a tensioned roller 47, and a suction unit (suction mechanism) 48.

It is possible for the suction unit 48 to suction the first screened material dispersed in the air after passing through the opening (opening of the mesh) of the screening unit 40 on the mesh belt 46. The first screened material is deposited on the moving mesh belt 46 and forms the web V. The specific configurations of the mesh belt 46, the tensioned roller 47, and the suction unit 48 are the same as the mesh belt 72, the tensioned roller 74, and the suction mechanism 76 of the second web forming unit 70, described later.

The web V is formed in a state of including large volumes of air and being softly swelled by passing through the screening unit 40 and the first web forming unit 45. The web V deposited on the mesh belt 46 is fed to the pipe 7 and transported to the mixing unit 50.

The mixing unit 50 mixes the first screened material (first screened material transported by the first web forming unit 45) passing through the screening unit 40 and the additive agent that includes a resin. The mixing unit 50 includes an additive agent supply unit 52 that supplies the additive agent, a pipe 54 that transports the screened material and the additive, and a blower 56. In the examples in the drawings, the additive agent is supplied from the additive agent supply unit 52 to the pipe 54 via the hopper 9. The pipe 54 is contiguous with the pipe 7.

An airflow is generated by the blower 56 in the mixing unit 50, and it is possible to transport the first screened material and the additive agent while being mixed in the pipe 54. The mechanism by which the first screening material and the additive agent are mixed is not particularly limited, and may be a mechanism that performs agitating with blades that rotate at high speed, or may be a mechanism that uses the rotation of a container such as a V-type mixer.

A screw feeder as shown in FIG. 1, a disk feeder, not shown, or the like is used as the additive agent supply unit 52. The additive agent supplied from the additive agent supply unit 52 includes a resin for causing the plurality of fibers to bond. At the point in time at which the resin is supplied, the plurality of fibers is not bonded. The resin is fused when passing through the sheet forming unit 80 and the plurality of fibers is bonded.

The resin supplied from the additive agent supply unit 52 is a thermoplastic resin or a heat-curable resin, and is an AS resin, an ABS resin, polypropylene, polyethylene, polyvinyl chloride, polystyrene, an acrylic resin, a polyester resin, polyethylene terephthalate, polyphenylene ether, polybutylene terephthalate, nylon, polyamide, polycarbonate, polyacetal, polyphenylene sulfide, polyetherether ketone, or the like. These resins may be used independently or mixed, as appropriate. The additive agent supplied from the additive agent supply unit 52 may be in the form of fibers, or may be in the form of a powder.

The additive agent supplied from the additive agent supply unit 52 may include, according to the type of sheet manufactured, coloring agents for coloring the fibers, coagulation inhibitors for preventing aggregation of the fibers, and flame retardants for making the fibers and the like more difficult to burn, in addition to the resin that bonds the fibers. The mixture (mixture of the first classified material and the additive agent) passing through the mixing unit 50 is transferred to the deposition unit 60 via the pipe 54.

The deposition unit 60 introduces the additive agent passing through the mixing unit 50 from the introduction port 62, refines the entangled defibrated material (fibers) and causes the defibrated material to descend while being disperse in air. The deposition unit 60 refines the entangled resin in a case where the resin of the additive agent supplied from the additive agent supply unit 52 is in the form of a fiber. In so doing, it is possible for the deposition unit 60 to cause the mixture to be uniformly deposited on the second web forming unit 70.

A cylindrical sieve that rotates is used as the deposition unit 60. The deposition unit 60 includes a mesh, and causes the fibers of particles (passing through the mesh) included in the mixture passing through the mixing unit 50 and smaller than the size of the mesh openings to descend. The configuration of the deposition unit 60 is that same as the configuration of the screening unit 40.

The "sieve" of the deposition unit 60 may have a function of screening specified target materials. That is, the wording "sieve" used as the deposition unit 60 signifies a sieve provided with a mesh, and the deposition unit 60 may cause all of the mixture introduced to the deposition unit 60 to descend.

The second web forming unit 70 accumulates the passing-through material passing through deposition unit 60 and forms the web W. The second web forming unit 70 includes a mesh belt 72, a tensioned roller 74, and a suction mechanism 76.

The mesh belt 72 accumulates the passing-through material passing through the openings (openings of the mesh) of the deposition unit 60 while moving. The mesh belt 72 has a configuration in which the mesh belt 72 is tensioned by the tensioned roller 74, and air that does not easily pass through the passing-through material passes therethrough. The mesh belt 72 moves through the tensioned roller 74 rotating. The web W is formed on the mesh belt 72 by the passing-through material passing through the deposition unit 60 continuously accumulating while the mesh belt 72 continuously moves. The mesh belt 72 is made from a metal, a resin, a fabric, a non-woven fabric or the like.

The suction mechanism 76 is provided below (opposite side to the deposition unit 60 side) the mesh belt 72. It is possible for the suction mechanism 76 to cause a downward moving airflow (airflow from the deposition unit 60 to mesh belt 72) to be generated. It is possible for the mixture dispersed in the air by the deposition unit 60 to be suctioned onto the mesh belt 72 by the suction mechanism 76. In so doing, it is possible for the discharge speed from the deposition unit 60 to be increased. It is possible to form a down flow in the dropping path of the mixture by the suction mechanism 76, and it is possible to avoid the defibrated material and the additive agent being entangled during dropping.

As above, the web W is formed in a state of including large volumes of air and being softly swelled by passing through the deposition unit 60 and the second web forming unit 70 (web forming step). The web W deposited on the mesh belt 72 is transported to the sheet forming unit 80.

In the examples in the drawings, a moisture-adjusting unit 78 that adjusts the moisture of the web W is provided. It is possible for the moisture-adjusting unit 78 to add water or water vapor to the web W and regulate the ratio of the web W to the water.

The sheet forming unit 80 forms the sheet S by heating the web W deposited on the mesh belt 72. In the sheet forming unit 80, it is possible for the plurality of fibers in the mixture to be bonded to one another via the additive (resin) by applying heat to the mixture of the defibrated material and the additive agent mixed into the web W.

A heating roller (heater roller), a hot press molding machine, a hot plate, a hot air blower, an infrared heating device, or a flash fixing device is used as the sheet forming unit 80. In the examples in the drawings, the sheet forming unit 80 is provided with a first bonding unit 82 and a second bonding unit 84, and the bonding units 82 and 84 are each provided with a pair of heating rollers 86. It is possible to form the sheet S while continuously transporting the web W by configuring the bonding unit 82 and 84 as heating rollers 86, compared to a case of configuring the bonding units 82 and 84 as a plate-like press device (plate press device). The number of heating rollers 86 is not particularly limited.

The cutting unit 90 cut the sheet S formed by the sheet forming unit 80. In the examples in the drawings, the cutting unit 90 includes a first cutting unit 92 that cut the sheet S in a direction that intersects the transport direction of the sheet S and a second cutting unit 94 that cuts the sheet S in a direction parallel to the transport direction. The second cutting unit 94 cuts the sheet S passing through the first cutting unit 92.

As above, a cut-form sheet S with a predetermined size is formed. The cut-form sheet S that is cut is discharged to the discharge unit 96.

1.2. Fiber

In the sheet manufacturing apparatus 100 of the embodiment, the raw material is not particularly limited, and it is possible for a wide range of fiber materials to be used. Examples of the fibers include natural fibers (animal or plant fibers) and chemical fibers (organic, inorganic or organic-inorganic composite fibers), and more specifically, examples include fibers made from cellulose, silk, wool, cotton, hemp, kenaf, flax, Ramie, jute, manila hemp, sisal hemp, softwood, and hardwood, and fibers made from rayon, lyocell, cupra, vinylon, acrylic, nylon, aramid, polyester, polyethylene, polypropylene, polyurethane, polyimide, carbon, glass, and metal and these may be used independently or mixed, as appropriate, or may be used as a regenerated fiber on which purification or the like is performed. Although examples of the raw material include recycled paper and recycled cloth, at least one of these fibers may be included. The fiber may be dried or may be contained or be impregnated with a liquid such as water or an organic solvent. Various surface treatments may be performed. The material of the fibers may be a pure material, or may be a material that includes various components such as impurities, additives and other components.

In this way, although the sheet manufacturing apparatus 100 of the embodiment can use various types of raw material, among these, a recycled paper, pulp sheet or the like that includes cellulose fibers has a more remarkable effect of improve the attachment of the composite and the fibers due to the fiber, described later, than a case of other fibers, because cellulose has a comparatively high hydrophilicity and is less easily charged.

When the fibers used in the embodiment are made one independent fiber, the average diameter (in a case where the cross-section is not a circle (diameter of a circle when a circle having the greatest length from the lengths in a direction perpendicular to the length direction or equivalent to the area of the cross-section (equivalent circle diameter)) thereof is 1 µm or more to 1000 µm or less, 2 µm or more to 500 µm or less is preferable, and 3 µm or more to 200 µm or less is more preferable.

Although the length of the fibers used by the sheet manufacturing apparatus 100 of the embodiment is not particularly limited, in one independent fiber, the length along the length direction of the fiber is 1 µm or more to 5 mm or less, 2 μm or more to 3 mm or less is preferable, and 3 μm or more to 2 mm or less is more preferable. In a case where the length of the fibers is short, although the strength of the sheets may be insufficient because the fibers do not easily bond with the composite, it is possible to obtain a sufficiently strong sheet as long as the length is within the above ranges.

The average length of the fibers, as the length-length-weighted mean fiber length, is 20 μm or more to 3600 μm or less, 200 μm or more to 2700 μm or less is preferable, and 300 μm or more to 2300 μm or less is more preferable. The length of the fibers may have variations (distribution), and in a case where a normal distribution in a distribution obtained with an n of 100 or more is assumed, the δ for the length of one independent fiber may be 1 μm or more to 1100 μm or less, preferable 1 μm or more to 900 μm or less, and more preferably 1 μm or more to 600 μm or less.

It is possible to measure the thickness and length of the fibers with various optical microscopes, scanning electron microscopes (SEM), transmission electron microscopes, fiber testers, or the like. In a case of microscopic observation, cross-sectional observation and observation in a state where both ends of the one independent fiber are stretched so as to not be cut away, as necessary, can be performed by carrying out pretreatment, as appropriate, on the observation sample, as necessary.

In the sheet manufacturing apparatus 100 of the embodiment, the fibrous raw material is defibrated by the defibrating unit 20, and transported to the mixing unit 50 as the first screened material passing through the classifying unit 30 and the screening unit 40. The classifying unit 30 may be omitted in cases where the function (removal of resin powder and ink powder from the defibrated material) of the classifying unit 30 with respect to web V are fulfilled by the mesh belt 46 of the screening unit 40 and the suction unit (suction mechanism) 48. In this case, the defibrated material defibrated by the defibrating unit 20 is introduced to the screening unit 40.

1.3. Composite

The additive agent supplied from the additive agent supply unit 52 includes a resin for causing the plurality of fibers to bond. At the point in time at which the resin is supplied, the plurality of fibers is not bonded. The resin is fused when passing through the sheet forming unit 80 and the plurality of fibers is bonded.

In the embodiment, the additive agent supplied from the additive agent supply unit 52 is a composite (particles) in which at least a portion of the surface of the resin particles is covered by inorganic fine particles. The composite may be used independently or mixed with another substance, as appropriate.

The composite of the embodiment receives a frictional charging action when supplied from the additive agent supply unit 52 and passes through the mixing unit 50 and the deposition unit 60. The charged composite is attached (electrostatically adsorbed) to the fibers even in a state where attached to the fibers and deposited with on the mesh belt 72 along with the fibers, to form the web W.

The absolute value of the average charging amount of the composite of the embodiment is 40 μC/g or higher. The absolute value of the average charging amount of the composite is preferably 60 μC/g or more, more preferably 70 μC/g or more, still more preferably 80 μC/g or more, and particularly preferably 85 μC/g or more because the higher the value becomes, the more it is possible for the composite to be strongly or more frequently attached to the fibers.

It is possible for the charging amount of the composite to be measured while the composite is frictionally charged. It is possible to perform the measurement of the charging amount by agitating (mixing) a powder, referred to as a standard carrier, and the composite in air, and measuring the charging amount of the powder. It is possible to use a standard carrier for a positive polarity toner or for a negative polarity toner that is a spherical carrier in which the ferrite core is surface treated available (standard carrier for positive polarity of negative polarity toner, available as "P-01" or "N-01") from the Imaging Society of Japan, a ferrite carrier available from Powdertech Co., Ltd. or the like as the standard carrier.

More specifically, it is possible to obtain the absolute value of the average charging amount of the composite as shown next. A mixed powder with 80% by weight of the carrier and 20% by weight of the composite is fed into an acrylic container, the container is rotated for 60 seconds at 100 rpm while being mounted to a ball mill table, and the carrier and the composite (powder) are mixed. It is possible to determine the absolute value [|μC/g|] of the average charging amount for the mixture in which the composite and the carrier are mixed by measuring with a compact draw-off charge measurement device (for example, a Model 210 HS-2, manufactured by TREK Japan KK).

By the absolute value of the average charging amount of the composite being 40 μC/g or higher, it is possible for the charged composite to be attached (electrostatically adsorbed) to the fibers even in a state where attached to the fibers and deposited on the mesh belt 72 along with the fibers, to form a web W. Such a composite of the embodiment is realized through the structure, materials, and the like as described below in the next items.

It is preferable that the particle diameter of the composite particles (volumetric average particle diameter) is 50 μm or less, 30 μm or less is more preferable, 25 μm or less is still more preferable, and 20 μm or less is particularly preferable. When the average particle diameter is small, it is possible to suppress detachment of from the fibers due to the weight of the particles themselves because the force of gravity acting on the composite is small, and because the air resistance is low, it is possible to suppress separation from between the fibers due to the airflow (wind) arising due to the suction mechanism 76 or the like and separation due to mechanical vibration. If within the above particle diameter range, it is possible for the composite to be made sufficiently difficult to detach from the fibers by an average charging amount of 40 μC/g or higher.

Although the opening size of the mesh belt 72 can be set, as appropriate, because the composite attaches to the fibers, passing through the mesh belt 72 is suppressed even in a case where the particle diameter of the composite is smaller than the opening size (size of hole that matter passes through) of the mesh belt 72. That is, the composite of the embodiment obtains a more remarkable effect in a case where the particle diameter of the composite is smaller than the opening size of the mesh belt 72.

The lower limit of the average particle diameter of the composite particles is not particularly limited, for example, is 10 μm, and is arbitrary within a range able to be pulverized by a method of crushing or the like. The average particle diameter of the composite particle may have a distribution, and, as long as the resin and the inorganic fine particles are integrated, it is possible to obtain the effect of suppressing detachment from between the above-described fibers.

It is possible to measure the average particle diameter of the composite particles using a particle size distribution analyzer in which the measurement principle is the laser diffraction scattering method. A particle size distribution analyzer in which the measurement principle is dynamic light scattering (for example, the "Microtrac UPA", manufactured by Nikkiso Co., Ltd.) is an example of the particle counter.

The composite may contain other components. Examples of the other components include organic solvents, surfactants, preservative and fungicide agents, antioxidants, ultraviolet absorbing agents, and oxygen absorbing agents.

1.3.1. Structure of Composite

The composite is in a state in which inorganic fine particles cover at least a portion of the surface of the resin particles, and the resin particles or inorganic fine particles from the composite are in a state of not easily breaking apart (not easily divided) in either or both of the sheet manufacturing apparatus 100 and in the web W or the sheet S. That is, the state in which inorganic fine particles cover at least a portion of the surface of the resin particles indicates at least one state of a state in which the resin and the inorganic fine particles are kneaded, a state in which inorganic fine particles are attached or bonded to the surface of the resin particles, a state in which the inorganic fine particles are structurally (mechanically) fixed to the surface of the resin particles, and a state in which the resin particles and the inorganic fine particles are aggregated due to electrostatic force, Van der Waal's forces or the like. The state in which inorganic fine particles cover at least a portion of the surface of the resin particles may also be a state in which the inorganic fine particles are encapsulated by the resin particles or a state in which the inorganic fine particles are attached to the resin. Furthermore, these states may also be present at the same time. In the specification, the state in which inorganic fine particles cover at least a portion of the surface of the resin particles may be a state in which the resin particles and the inorganic fine particles are integrally included.

Figure 2A:
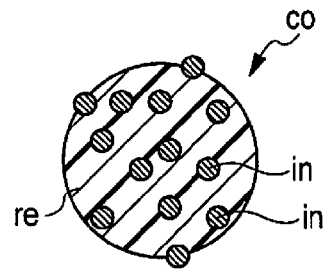
FIGS. 2A and 2B are schematic views of several examples of cross-sections of the composite according to the embodiment.

FIG. 2 schematically shows several states of cross-sections of the composite in which the resin and the inorganic fine particles are integrally included. Examples of the specific aspects of the composite in which the resin and the inorganic fine particles are integrally included include, as shown in FIG. 2A, a composite co in which the inorganic fine particles in are kneaded into the resin re and dispersed and at least a portion of the inorganic fine particles are exposed in the surface of the composite co.

Figure 2B:
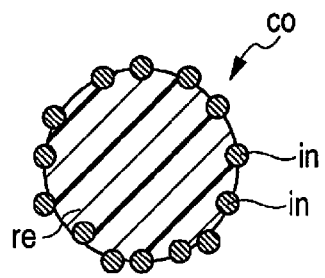

As shown in FIG. 2B, the inorganic fine particles in may be arranged so as to cover the surface of the resin re. That is, examples of the specific aspect of the composite in which the resin and the inorganic fine particles are integrally included, as shown in FIG. 2B, include a composite co in which the inorganic fine particles in are embedded, bonded to and/or attached to the surface of the resin re. The bonding and or attachment of both of the component in the example may be based on electrostatic forces, Van der Waal's forces, or the like.

In the structure of the composite co shown in FIGS. 2A and 2B, although the inorganic fine particles in cover a portion of the surface of the particles of the resin re, the inorganic fine particles in may cover the entire surface of the particles of the resin re, or may cover the surface of the particles of the resin re in multiple layers. A structure may be used in which the structure shown in FIG. 2A and the structure shown in FIG. 2B are combined.

In the examples in FIGS. 2A and 2B, although either of the external shape of the composite and the external shape of the inorganic fine particles are schematically shown as close to spherical, the external shape of the composite and the inorganic fine particles is not particularly limited, and may be a shape such as disk-shaped, needle shaped, and an irregular shape. However, it is more preferable that the shape of the composite approach spherical as much as possible because of the ease of being arranged between the fibers in the mixing unit 50.

The composite with any of the structures shown in FIGS. 2A and 2B is also not easily divided into the resin and the inorganic fine particles when mixed in the mixing unit 50. In the present application, in a case where the resin and the inorganic fine particles are not divided in the composite, although it is desirable to be completely undivided with respect to the number of composite particle of the powder overall, in practice, achieving a state of being completely undivided is difficult. Therefore, the undivided state indicates a state in which the 70% or more of the composite particle are not divided from the resin and the inorganic fine particles when averages with respect to number of composite particles in the powder overall.

It is possible to verify the structure of the composite co as shown in FIGS. 2A and 2B through various means, such as any structural analysis method such as an electron microscope. It is possible to evaluate whether or not the inorganic fine particles are coated by the resin particles by measuring the angle of repose. It this possible to measure the angle of repose in compliance with the method of "Alumina Powder—Part 2: Determination of Physical Properties—2: Angle of repose" in JIS R 9301-2-2:1999. With respect to the resin particles not coated by the inorganic fine particles, it is possible to verify that the angle of repose is small in a composite coated by the inorganic fine particles.

1.3.2. Function of Composite

Although several aspects of the composite in which the resin and the inorganic fine particles are integrally included are given as examples, even in any of the aspects, the resin and the inorganic fine particles are not easily isolated, and the composite adsorbed on the fibers is not easily detached when receiving various treatments in the sheet manufacturing apparatus 100 or when the web W or the sheet S is formed.

The inorganic fine particles have the function of improving the charging amount of the resin particles (composite) in a case of being arranged on the surface of the resin particles compared to a case where the inorganic fine particles are not present. Although various inorganic fine particles can be used, in the sheet manufacturing apparatus 100 of the embodiment, it is preferable to use a type (may be coated (covered) or the like) arranged in the surface of the composite because little to no water is used.

The inorganic fine particles cause an adsorptive force (adhesive force) to arise between the composite and the fibers by increasing the charging properties of the composite. Therefore, when deposited as a web W on the mesh belt 72 of the second web forming unit 70 of the sheet manufacturing apparatus 100, it is possible to make the composite less easily detach from the fibers. In so doing, it is possible to make the mechanical strength of the sheet S manufactured by the sheet manufacturing apparatus 100 a predetermined strength. That is, since the composite of the embodiment has a sufficient adhesive force (electrostatic bonding force) to the fibers when arranged between the fibers, the composite is not easily detached from the fibers. It is thought the cause for obtaining such an effect is because there is an action in which a static electricity is generated by friction and the composite (resin) is caused to bond to the fibers, due to being more easily frictionally charged and the composite being mixed with the fibers in the atmosphere in the mixing unit 50 by the inorganic fine particles being arranged in the surface of the resin particles.

1.3.3. Material of Composite

Although already described, examples of the type of the resin (component of the resin particles) that is a component of the composite include a thermoplastic resin or a heat-curable resin, and is an AS resin, an ABS resin, polypropylene, polyethylene, polyvinyl chloride, polystyrene, an acrylic resin, a polyester resin, polyethylene terephthalate, polyphenylene ether, polybutylene terephthalate, nylon, polyamide, polycarbonate, polyacetal, polyphenylene sulfide, polyetherether ketone, or the like. These resins may be used independently or mixed, as appropriate.

More specifically, the type of resin (component of the resin particles) that is a component of the composite may be either a natural resin or a synthetic resin, and may be either a thermoplastic resin or a heat-curable resin. In the sheet manufacturing apparatus 100 of the embodiment, the resin that configures the composite is preferably a solid at room temperature, and is preferably a thermoplastic resin in consideration of bonding the resin due to heat in the sheet forming unit 80.

Examples of the natural resin include rosin, dammar, mastic, copal, amber, shellac, dragon's blood palm resin, sandarac, and colophony, and these resins may be independent or mixed, as appropriate, and may be modified as appropriate.

Examples of the heat-curable resin from the synthetic resins include heat-curable resins such as phenol resins, epoxy resins, melamine resins, urea resins, unsaturated polyester resins, allkyd resins, polyurethane, and heat-curable polyimide resins.

Examples of the thermoplastic resin from the synthetic resins include AS resins, ABS resins, polypropylene, polyethylene, polyvinyl chloride, polystyrene, acrylic resins, polyester resins, polyethylene terephthalate, polyphenylene ether, polybutylene terephthalate, nylon, polyamide, polycarbonate, polyacetal, polyphenylene sulfide, and polyetherether ketone.

Copolymerization or modification may be performed, and examples of such systems of resin include styrene resins, acrylic resins, styrene-acrylic copolymer resins, olefin based, polyvinyl chloride resins, polyester resins, polyamide resins, polyurethane resins, polyvinyl alcohol resins, vinyl ether resins, N-vinyl resins, and styrene-butadiene resins.

Meanwhile, examples of the inorganic fine particles include fine particles formed from inorganic materials, and it is possible for an extremely superior charging effect to be obtained by arranging these in the surface of the resin particles (composite).

Specific examples of the material of the inorganic fine particles include silica (silicon oxide), titanium oxide, aluminum oxide, zinc oxide, cerium oxide, magnesium oxide, zirconium oxide, strontium titanate, barium titanate, and calcium carbonate. The inorganic fine particles arranged in the surface of the resin particles may be a single type or may be a plurality of types.

Although not particularly limited, the volumetric average (primary) particle diameter (volume average particle diameter) of the inorganic fine particles is 1 nm or more to 100 nm or less, preferably 2 nm or more to 80 nm or less, more preferably 5 nm or more to 50 nm or less, and still more preferably 10 nm or more to 40 nm or less. Although the inorganic fine particles being primary particles is normal in light of being close to the category of so-called nanoparticles, and the particle diameter being small, a plurality of primary particles may be bonded to form a higher order particle. The inorganic fine particles of the embodiment have a small particle diameter, the proportion of the surface area per weight is larger, and the area when frictionally charged accordingly is also large. Therefore, it is possible for the particle diameter of the inorganic fine particles to obtain a favorable charging effect if within the above ranges. If the particle diameter of the inorganic fine particles is within the above ranges, it is possible for the surface of the composite to be well coated, and also on this point, it is possible to stably contribute a sufficient charging effect.

It is possible to measure the average (primary) particle diameter of the inorganic fine particles according to an established method from the relationship between the specific surface area and the density obtained by a BET method or the like.

If the content of the inorganic fine particles in the composite is 0.01% by weight or more to 10% by weight or less to 100% by weight of the composite, it is possible to obtain the above effects, and from the viewpoint of further increasing the effect and/or effectively using the inorganic fine particles (when there are too many inorganic fine particles, even if the addition amount is increased, the charging amount does not easily increase) or the like, 0.05% by weight or more to 5% by weight or less to 100% by weight of the composite is preferable, 0.1% by weight or more to 4% by weight or less is more preferable, and 0.1% by weight or more to 3% by weight or less is still more preferable.

The method of arranging (coating) the inorganic fine particles in the surface of the composite is not particularly limited, and the inorganic fine particles may be arranged along with the resin when forming the composite by melt-kneading or the like as described above. However, if done in this way, because the inorganic fine particles are largely arranged inside the composite, the charging amount with respect to the addition amount of the inorganic fine particles is reduced. It is more preferable that the inorganic fine particles are arranged as much as possible in the surface of the composite based on the charge generating mechanism. Although examples of the form for arranging the inorganic fine particles in the surface of the composite include coating and covering, the entire surface of the composite is not necessarily coated. Although the coverage ratio may exceed 100%, when reaching approximately 300% or more, because there are cases where the action of bonding the composite and the fibers is impeded, an appropriate coverage ratio is selected according to the situation.

Although various methods are considered as the method of arranging the inorganic fine particles in the surface of the composite, although it is possible to exhibit the effect by simply mixing together both and being attached to the surface only by electrostatic force or Van der Waal's forces, the concern of dropping off remains. Therefore, a method of feeding and uniformly mixing the composite and the inorganic fine particles in a mixer that rotates at high speed is preferable. It is possible to use a known device as such a device, and it is possible to perform mixing using an FM mixer, a Henschel mixer, a super mixer, or the like. It is possible to arrange the particles of the inorganic fine particles in the surface of the composite by such a method. There are cases where at least a portion of the inorganic fine particles arranged by such a method are arranged in a state of biting into or a state of being embedded into the surface of the composite, and it is possible to make the inorganic fine particles more difficult to detach from the composite, and it is possible to stably exhibit the charging effect. When such a method is used, it is possible to easily realize the above-described arrangement in a system included little to no water content. Even if inorganic fine particles that do not bite into the composite are present, it is possible for such an effect to be sufficiently obtained. It is possible for the states in which the inorganic fine particles bite into or are embedded in the surface of the composite to be verified by various electron microscopes.

If the proportion covered by the inorganic fine particles in the composite surface (area ratio: in the specification, may be referred to as the coverage ratio) is 20% or more to 100% or less, it is possible to obtain a sufficient charging effect. It is possible to adjust the coverage ratio by incorporating in a device such as an FM mixer. If the specific surface area of the inorganic fine particles and the composite is known, it is possible to perform regulation by the weight (mass) of each component when incorporated. It is possible to measure the coverage ratio with various electron microscopes. In a case where the inorganic fine particles are arranged in a form of being not easily detached from the composite, it is possible for the inorganic fine particles to be integrally included in the composite.

The inorganic fine particles may be subjected to surface modification. Specifically, the surface of the inorganic fine particles may be modified by chemically treating the surfaces thereof with a silane compound and these may be used. Examples of such a silane compound include alkyl silanes, such as trimethyl silane, dimethyl silane, triethyl silane, triisopropyl silane, and triisobutyl silane, and silane coupling agents such as vinyltrimethoxy silane and vinyltriethoxy silane.

Because the composite includes inorganic fine particles, the composite easily electrostatically attaches to the fibers, and it is possible to make dropping from the fibers and dropping from the web and sheet less easily arise. It is possible to extremely favorably mix together the composite and the fibers due to the agitation of the airflow or mixer. Examples of reasons therefor include a tendency for the composite to become easier to charge with static electricity in a case where inorganic fine particles are arranged in the surface of the composite, and the composite becomes easier to attach to the fibers due to the static electricity. The composite attached to the fibers by to the static electricity becomes less easily detached from the fibers even in cases where a mechanical impact or the like occurs. Therefore, mixing is quickly performed and dropping off sufficiently suppressed without using a special unit other than for mixing the fibers and the composite. Attachment of the composite to the fibers after mixing is stabilized, no detachment phenomenon is observed in the composite.

It is thought that the composite particles become more strongly attached to the fibers by the electrostatic force than in a case of independent resin particles. Even in a case where the resin particles include a pigment, it is found that the effect of the inorganic fine particles is not impeded. Although it is ordinarily difficult for static electricity to accumulate when the moisture is high, the adhesive force of the composite to the fibers is improved by the presence of the inorganic fine particles even if some measure of water content is included in a case where the fibers are cellulose.

1.3.4. Other Components

Although it has been described that coloring agents for coloring fibers, or flame retardants for making fibers or the like more difficult to burn may be included in the composite, in cases where at least one type of these is included, it is possible for these effects to be more easily obtained by blending these into the resin by melt-kneading. It is possible to blend the inorganic fine particles by mixing the resin powder and the inorganic fine particle powder with a high speed mixer or the like after forming such as resin powder.

Although the above-described fibers and composite are mixed together in the mixing unit 50, it is possible for the mixing ratio thereof to be regulated, as appropriate, according to the strength, usage, or the like of the manufactured sheet S. If the manufactured sheet S is for a work usage, such as copy paper, the proportion of the composite to the fibers is 5% by weight or more to 70% by weight or less, and from the viewpoints of obtaining favorable mixing in the mixing unit 50 and making the composite more difficult to detach due to gravity in a case where the mixture is formed in a sheet-shape, 5% by weight or more to 50% by weight of less is preferable.

1.4. Mixing Unit

The mixing unit 50 provided in the sheet manufacturing apparatus 100 of the embodiment has a function of causing the fibers and the composite to be mixed together. At least the fibers and the composite are mixed together in the mixing unit 50. In the mixing unit 50, components other than the fibers and the composite may be mixed together. The wording "the fibers and the composite are mixed together" is defined as the composite being positioned between the fibers in a space (system) with a fixed volume.

The process of mixing together in the mixing unit 50 of the embodiment is a method (dry-type) in which the fibers and the composite are introduced into the airflow and diffused together in the airflow, and is a fluid dynamic mixing process. The wording "dry-type" in the mixing refers to the state of being mixed together in air rather than in water. That is, the mixing unit 50 may function in the drying state, or may function in a state where a liquid present as an impurity or an intentionally added liquid is present. In the case of intentionally adding the liquid, it is preferable for the liquid to be added to an extent that the energy and time for removing the liquid through heat or the like do not increase excessively in later processes. In the method, this is more preferable because the airflow in the pipe 54 or the like being turbulent make the mixing together efficient.

The processing capacity of the mixing unit 50 is not particularly limited as long as it is able to cause the fibers (fibrous material) and composite to mix together, and it is possible to regulate the design, as appropriate, according to the manufacturing capacity (throughput) of the sheet manufacturing apparatus 100. It is possible for the regulation of the processing capacity of the mixing unit 50 to be performed by the flow rate of the gas for transferring the fibers and the composite in the pipe 54, the introduction rage of the material, and the transfer rate or the like being changed.

The mixture mixed together by the mixing unit 50 may be further mixed by another configuration such as a sheet forming unit. In the example in FIG. 1, although the mixing unit 50 includes a blower 56 provided in the pipe 54, a further blower, not shown, may be included.

The blower is a mechanism in which the fibers and the composite are mixed, and includes a rotary unit having blades that rotate. By the blades rotating, either or both of the fibers and the composite are rubbed by the blades or impact the blades. By the blades rotating, any or all of the fibers and the fibers, the fibers and the composite and the composite and the composite impact each other and rub against one another according to the airflow formed by the blades.

It is thought that due to such impact or rubbing, at least the composite is charged (charged with static electricity), and an adhesive force (electrostatic force) for attaching the composite to the fibers is generated. The strength of such an adhesive force depends on the properties of the fibers and the composite and the structure (shape and the like of the rotating blades) of the blower. Even in cases where one blower 56 is provided as shown in FIG. 1, although it is possible to obtain a sufficient adhesive force, there are cases where it is possible to obtain a stronger adhesive force by further providing another blower on the downstream side of the additive agent supply unit 52. The increasing number of blowers is not particularly limited. In a case of providing a plurality of blowers, the main functions of the blowers may be divided such as providing a blower with a strong air blowing force, a blower with a larger agitation force (capability caused by being charged) or the like. In this way, there are cases where it is possible for adhesive force of the composite to the fibers to be further increased, and it is possible for detachment of the composite from between the fibers to be further suppressed when forming the web W.

1.5. Actions and Effects

For the sheet manufacturing apparatus 100 of the embodiment, because the composite mixed with the fibers in the mixing unit 50 has at least a portion of the surface of the resin particles coated by the inorganic fine particles, the composite is not easily detached from between the fibers when the web is formed. Since the composite and the fibers are bonded in the sheet forming unit 80, it is possible for the dispersibility of the resin to be favorable, and to manufacture a sheet with favorable uniformity of strength and the like.

The composite used in the sheet manufacturing apparatus 100 of the embodiment has a much superior adhesive force with the fibers. By the inorganic fine particles being integrally added to the resin, the composite particles are easily charged with static electricity, the electric charging amount as a result increases, and the adhesive force to the fibers is improved according to the nature of being easily charged with static electricity that the inorganic fine particles have.

The sheet manufacturing apparatus of the embodiment includes, in the second web forming unit 70, the mesh belt 72 and the suction mechanism 76 that form the web W, and it is possible for the suction mechanism 76 to be the suction unit that suctions the mixture discharged by the deposition unit 60 via the mesh belt 72. By the suction unit performing suction via the mesh belt, although the possibility of the composite detaching from the fibers increases, according to the sheet manufacturing apparatus of the embodiment, it is possible to suppress detachment of the composite from the fibers regardless of whether a suction unit is included.

2. SHEET MANUFACTURING METHOD

The sheet manufacturing method of the embodiment includes a step of mixing the fibers and the composite, in which the resin and the inorganic fine particles are integrated, in air, and a step of depositing, heating and forming a mixture in which the fibers and the composite are mixed. Because the fibers, the resin, the inorganic fine particles, and the composite are the same as those described in the above-described sheet manufacturing apparatus item, detailed description thereof will not be provided.

The sheet manufacturing method of the embodiment may include at least one step selected from a group composed of a step for cutting a pulp sheet or recycled paper as a raw material in air, a defibrating step of disentangling the raw material in air into a fibrous form, a classifying step of classifying, in air, impurities (toner or paper strengthening agent) and fibers (short fibers) shortened by defibration from the defibrated material that is defibrated, a screening step of screening, in air, long fibers and undefibrated pieces that are insufficiently defibrated from the defibrated material, a dispersing step of causing the mixture to descend while being dispersed in air, a forming step of forming the descended mixture in a web shape or the like while being deposited, a drying step of causing the sheet to be dried as necessary, a winding step of winding the formed sheet into a roll shape, a cutting step of cutting the formed sheet, and a packaging step of packaging the manufactured sheet. The details of these steps are the same as those described in the above-described sheet manufacturing apparatus, and thus detailed description will not be repeated.

3. SHEET

The sheet S manufactured by the sheet manufacturing apparatus 100 or the sheet manufacturing method of the embodiment indicates a sheet in which at least the above-described fibers are the raw material and formed into a sheet form. However, there is no limitation to a sheet form, and the shape may be a board form, web form, or a shape having concavities and convexities. The sheets in the specification can be classified into paper and non-woven fabric. Paper includes forms in which pulp or recycled paper as a raw material is formed in a sheet shape, and includes recording paper for the purpose of writing or printing, wallpaper, packaging paper, colored paper, image paper, Kent paper and the like. Non-woven fabric is a product thicker than paper or with low strength, and includes ordinary non-woven fabrics, fiber boards, tissue papers, kitchen papers, cleaners, filters, liquid absorbing materials, sound absorbers, shock absorbers, mats, and the like.

In the case of a non-woven fabric, the gap between fibers is wide (density of the sheet is low). In contrast, the paper has a narrow gap between fibers (density of the sheet is high). Therefore, the sheet S manufactured by the sheet manufacturing apparatus 100 or the sheet manufacturing method of the embodiment being a paper is more able to remarkably express the action and function of suppressing detachment of the composite from the fibers, uniformity of strength when formed as a sheet or the like.

4. ACCOMMODATION CONTAINER

The accommodation container of the embodiment is used while the fibers are mixed and accommodates the above-described composite in which the resin and the inorganic fine particles are integrated.

The composite of the embodiment is supplied to the mixing unit 50 according to the opening and closing of a filter or valve. The composite of the embodiment is supplied in a powdered state in appearance. Therefore, it is possible to configure the apparatus so that the composite is directly supplied to the mixing unit 50 through a pipe or the like after being manufactured. However, according to the installation location of the apparatus, it is thought that the composite is carried along a flow path as a commodity, and there are cases where transfer or storage is performed after the composite is manufactured.

The accommodation container of the embodiment includes an accommodation chamber that accommodates the composite, and it is possible for the composite to be accommodated in the accommodation chamber. That is, it is possible for the accommodation container of the embodiment to be a composite cartridge, and it is possible to easily transport and store the composite.

The shape of the accommodation container is not particularly limited, and it is possible for the shape to be made a cartridge shape suitable to the sheet manufacturing apparatus 100. It is possible to form the accommodation container with an ordinary polymer material. The accommodation container may also be a box-like robust form, or may be a film-(bag) like flexible form. It is preferable that the material that configures the accommodation container is configured from a material with a high glass-transition temperature or melting point compared to the material of the accommodated composite.

The accommodation chamber that accommodates the container is not particularly limited as long as it is able accommodate and hold the composite. It is possible for the accommodation chamber to be formed from a film, a molded body or the like. In a case where the accommodation chamber is formed by a film, the accommodation container may be formed including a molded body (housing) so as to accommodate the film that forms the accommodation chamber. The accommodation chamber may be formed by a comparatively robust molded body.

The film or molded body that forms the accommodation chamber may be configured from a polymer, a metal deposition film or the like, and may have a multilayer structure. In a case where the accommodation container is formed by a plurality of members such as a film or molded body, fused parts or bonded parts may be formed. In a case where the accommodated composite (powder) is influenced, such as deterioration, due to contact with the atmosphere, it is preferable that the film or molded body is formed from a material with little gas permeability. It is preferable that the material of the part that contacts the accommodated composite from the materials of the film and molded body that configure the accommodation chamber is stable with respect to the composite.

The shape and volume of the accommodation chamber is not particularly limited. Although the composite is accommodated in the accommodation chamber, an inactive solid or gas may be accommodated in contrast thereto. The volume of the composite accommodated in the accommodation chamber is also not particularly limited.

The accommodation chamber may include a flow port that communicates between the interior of the accommodation chamber and the exterior of the accommodation container, and is able to remove the composite to the outside of the composite. The accommodation chamber may have another flow path other than the flow port formed therein. The other flow path may be configured by a release valve or the like. In a case of providing the release valve in the accommodation chamber, although the position at which the release valve is arranged is not particularly limited, there are cases where providing the release valve is preferable because the composite is not easily discharged when the pressure is released to the atmosphere in cases where pressure and the like is generated in the accommodation chamber when arranged on the opposite side to the direction in which gravity acts in the normal posture when transferred, transported, and used.

5. OTHER PROVISIONS

Although the sheet manufacturing method and sheet manufacturing method of the embodiment use no or only a small amount of water, it is possible to manufacture the sheet while adding water, as appropriate, with the object of adjusting the moisture or the like, through spraying or the like as necessary.

It is preferable to use pure waters such as ion-exchange water, ultrafiltered water, reverse osmosis water, and distilled water or ultrapure water as the water. In particular, because water in which these waters are subjected to sterilization treatment by irradiation with ultraviolet rays or addition of hydrogen peroxide is able to suppress the generation of mold and bacteria over a long period of time, such water is preferable.

In the specification, the phrasing "uniform" indicates, in a case of uniform dispersion or mixing, the relative positions where one component is present with respect to the other component are even in the entire system or are the same or substantially equal in each part of the system to one another in a substance able to define a component with two types or more or two phases or more. Uniformity of coloring or uniformity of tone indicates an even concentration without tinting of the color when the sheet is seen in plan view.

In the specification, phrasing such as "uniform", "same", "even intervals" and the like are used to indicate that density, distance, measurement or the like are the same. Although it is desirable that these are equal, because being made completely equal is difficult, the wording includes being shifted by the cumulative errors or variations without the values being equal.

6. EXAMPLES

Below, although the present disclosure will be further described by the examples shown, the invention is not limited to the examples below.

6.1. Preparation of Composite

| | |
|---|---|
| (1) styrene-maleic acid resin (Tg: 74° C., molecular weight 6600): | 1.5 kg |
| (2) polyester resin (Tg: 56° C., molecular weight 10000): | 8.0 kg |
| (3) copper phthalocyanine pigment (Pigment Green 36): | 0.5 kg |

After the above materials were mixed in the hopper, the materials were fed to a twin screw kneading extruder and melt-kneading was performed at 90° C. to 135° C. The material was extruded by dicing to form strands, and cut into approximately 5 mm lengths to obtain tables.

After the tablets obtained above were subjected to processing for 30 seconds in a high speed mill and the tablets were roughly crushed into a granular form, the material was fed to a jet mill to obtain a powder with a particle diameter range of 1 μm to 40 μm.

Powdered resin particles (A1) configured from particles with a volumetric average particle diameter of 12 μm and a particle diameter range of 5 μm to 23 μm were obtained from the obtained powder obtained using the jet mill in the classifying device.

6.2. Example 1

| | |
|---|---|
| (1) resin particles (A1): | 100 g |
| (2) inorganic fine particles (M1): | 1.5 g |

By feeding the above materials into a tabletop blender, and agitating at a tip speed of 30 m/s for 80 seconds, the surface of the resin particles (A1) is coated with the inorganic fine particles (M1). The presence of a coating was verified by observing the particle surface with an SEM. Verification was also performed according to changes in the angle of repose were also verified. This is determined from the angle of repose decreasing when the coating (covering by inorganic fine particles) is formed. The inorganic fine particles (M1) use titanium dioxide in which the volumetric primary particle diameter in which the surface is subjected to hydrophobizing treatment with alkyl silane is 14 nm.

6.3. Example 2

Fine particles of silicon dioxide with a volumetric primary particle diameter of 12 nm in which the surface is modified by trimethyl silane are the inorganic fine particles (M2). Other than using the inorganic fine particles (M2) instead of the inorganic fine particles (M1) used in Example 1, Example 2 is the same as Example 1.

6.4. Example 3

Fine particles of silicon dioxide with a volumetric primary particle diameter of 20 nm in which the surface is modified by trimethyl silane are the inorganic fine particles (M3). Other than using the inorganic fine particles (M3) instead of the inorganic fine particles (M1) used in Example 1, Example 3 is the same as Example 1.

6.5. Example 4

Fine particles of silicon dioxide with a volumetric primary particle diameter of 20 nm in which the surface is modified by trimethyl silane are the inorganic fine particles (M4). Other than using the inorganic fine particles (M4) instead of the inorganic fine particles (M1) used in Example 1, Example 4 is the same as Example 1.

6.6. Example 5

Resin particles (A1) without any coating on the surface were formed.

6.7. Measurement of Charging Amount

| | |
|---|---|
| (1) Standard Carrier N-01 (available from the Imaging Society of Japan): | 4.85 g |
| (2) Powder of each example (composite or resin particles): | 0.15 g |

The above materials were fed to an acrylic container, the container rotated for 180 seconds at 100 rpm with the container mounted to a ball mill table, and the carrier and particles (powder) were mixed. The absolute value [|μC/g|] of the average charging amount of mixture in which the powder and the carrier are mixed was obtained with a compact draw-off charge measurement device (manufactured by TREK Japan KK, Model 210 HS-2), and disclosed in Table 1.

6.8. Evaluation of Retention Rate of Particles to Fibers

| | |
|---|---|
| (1) Nadelbaume Kraft Pulp (NBKP): | 16 g |
| (2) Composite Particles (Examples 1 to 4) or resin particles (Example 5): | 4 g |
| (3) Particle Content Rate: 4 g/(16 g + 4 g) = 20% by weight | |

The above masses were weighed and introduced to a 520 mm×600 nm×0.030 mm transparent polyethylene bag, air was blown in with an air gun, and pulp and the composite or resin particles were agitated by the airflow to mix a mixture (powder of each example) of pulp and the composite or pulp and the resin particles.

Figure 3:
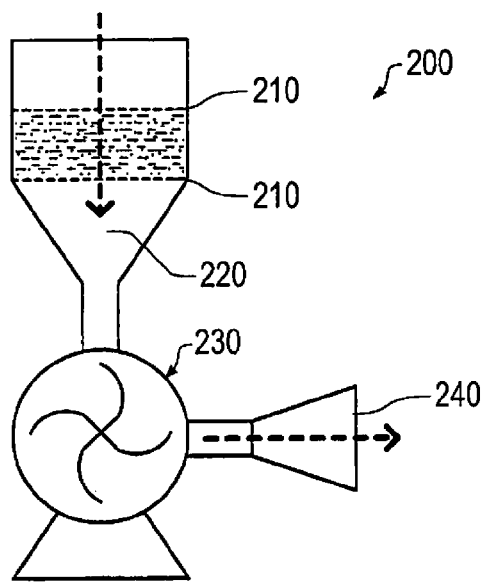
FIG. 3 is a schematic view showing an example of a suction device according to an example.

5.0 g of each powder of each example was extracted and gently spread equally on a 140 mesh standard sieve with tweezers. Thereafter, the sieve was covered and set on a suction device on the upper side of the sieve. FIG. 3 shows a schematic view of the suction device 200. The suction device 200 used is a self composed device, and is formed from a funnel-type funnel portion 220 on which the sieve 210 is set, a discharge device 230, and a discharge filter 240 with the configurations shown in FIG. 3. In the apparatus, in a case where a sieve 210 on which nothing is mounted is provided, the discharge speed of the discharge device 230 is adjusted so that the air speed at the mesh surface of the sieve 210 becomes 25±1 m/s. As long as the wind speed conditions are satisfied, the form of the device may not necessarily be as shown in FIG. 3. The value when the mass of each remaining mixed body after suction was performed for 30 seconds with the sieve 210 set on the suction device 200 in a state where each mixed body is interposed by the sieve 210 is X(g).

Here, the particle retention rate RV (%) is derived according to the formula $$RV=(5\times0.2-(5-X))/(5\times0.2)\times100=(X-4)\times100.$$

It is shown that the higher the particle retention rate, the more of the mixed body is held between the fibers of the pulp, and if the RV=100%, particles of the mixed body do not pass through the sieve 210 due to suction, and it can be said to be ideal. The particle retention rate of each example is disclosed in Table 1.

Although the weight of the mixed body interposed with the sieve 210 in each example is made 5.0 g, the mass may be regulated, as appropriate, from the testing efficiency. However, in each sieve 210 used in measurements, a volume of mixed body able to cover the entire surface of the sieve plane. In a case where a mass of mixed body that satisfies these conditions is selected, the value of RV obtained tends to not depend on the mass of the mixed body.

TABLE 1

| | Particle Coating | | Charging Amount [|μmC/g|] | Particle Retention Rate [%] |
|---|---|---|---|---|
| Example No. | Type of Inorganic Fine Particles and Volume Average Particle Diameter | Surface Modification | | |
| 1 | Titanium Dioxide Particle Diameter 14 nm | Triisobutyl Silane | 94 | 97 |
| 2 | Silicon Dioxide Particle Diameter 12 nm | Trimethyl Silane | 88 | 95 |

TABLE 1-continued

| | Particle Coating | | | |
|---|---|---|---|---|
| Example No. | Type of Inorganic Fine Particles and Volume Average Particle Diameter | Surface Modification | Charging Amount [\|μC/g\|] | Particle Retention Rate [%] |
| 3 | Silicon Dioxide Particle Diameter 20 nm | Trimethyl Silane | 75 | 93 |
| 4 | Silicon Dioxide Particle Diameter 40 nm | Trimethyl Silane | 41 | 79 |
| 5 | Not Used | — | 25 | 59 |

6.9. Evaluation Result

The sample characteristics and particle retention rate for each example are summarized in Table 1.

As in the above Table 1, it is determined that the charging amount of the obtained powder is able to be controlled by changing the coating state due to the inorganic fine particles of the resin particles. It is understood that it is possible to control the particle retention rate with respect to the pulp fibers by controlling the charging amount. It is thought that as the charging amount of the particles (composite) increases, the particle retention rate tends to increase, and the particle retention rate increasing is a state where the resin particles of the composite are firmly attached to the pulp fibers (cellulose) and not easily detached.

In light of Table 1, it is further found that since the particle retention rate becomes approximately 80% or more when the absolute value of the average charging amount is 40 μC/g or more, a level that is not damaged in sheet manufacturing in practice is attained. It is found that when the absolute value of the average charging amount is 80 μC/g or more the particle retention rate becomes 95% or more, and detachment from the fibers of the resin particles (composite) becomes extremely low, and is more favorable.

When the composite is a composite having a charging amount in the ranges as in Examples 1 to 4, the resin component is not easily detached from the fibers when manufacturing the sheet with a dry method, and, as a result, a tough sheet can be manufactured according to the design.

The present disclosure is not limited to the embodiments described above, and further, various modifications thereof are possible. For example, the invention includes configurations which are substantially the same as the configurations described in the embodiments (for example, configurations having the same function, method, and results, or configurations having the same purpose and effect). The invention includes configurations in which non-essential parts of the configurations described in the embodiments are replaced. The invention includes configurations exhibiting the same actions and effects as the configurations described in the embodiments or configurations capable of achieving the same object. The invention includes configurations in which known techniques were added to the configurations described in the embodiments.

The entire disclosure of Japanese Patent Application No. 2015-021829, filed Feb. 6, 2015 is expressly incorporated by reference herein.

What is claimed is:

1. A sheet manufacturing apparatus comprising:
   a mixing unit configured to mix fibers and a composite in the atmosphere; and
   a forming unit configured to deposit and heat a mixture mixed by the mixing unit to form a sheet,
   wherein the composite is resin particles with at least a portion of a surface coated with inorganic fine particles, and
   an absolute value of an average charging amount of the composite is 40 μC/g or higher.

2. The sheet manufacturing apparatus according to claim 1,
   wherein the mixing unit is configured to mix the fibers and the composite that has the resin particles with the volumetric average particle diameter that is 25 μm or less.

3. The sheet manufacturing apparatus according to claim 1,
   wherein the mixing unit is configured to mix the fibers and the composite that has the inorganic fine particles with the volumetric average particle diameter that is 40 nm or less.

4. The sheet manufacturing apparatus according to claim 1,
   wherein the mixing unit is configured to mix the fibers and the composite that is configured to not be divided into the resin and the inorganic fine particles during mixing in the mixing unit.

5. The sheet manufacturing apparatus according to claim 1,
   wherein the forming unit includes
   a discharging unit configured to discharge the mixture,
   a mesh belt configured to accumulate the mixture, and
   a suction unit configured to suction gas that includes the mixture via the mesh belt.

6. The sheet manufacturing apparatus according to claim 1,
   wherein the mixing unit is configured to mix the composite in which the content of the inorganic fine particles is 0.1% by weight or more to less than 4% by weight and the fibers.

7. The sheet manufacturing apparatus according to claim 1,
   wherein the mixing unit includes a plurality of rotary units having blades that rotate, and mixes the fibers and the composite by being passed through the rotary unit.

8. A sheet manufacturing method comprising:
   mixing fibers and a composite which has inorganic fine particles and a resin that are integrated, in air; and
   depositing, heating and forming a mixture in which the fiber and the composite are mixed.

* * * * *